United States Patent [19]
Nakayama et al.

[11] Patent Number: 5,186,583
[45] Date of Patent: Feb. 16, 1993

[54] ROTARY CUTTER

[75] Inventors: Masaaki Nakayama; Masayuki Okawa, both of Ibaraki, Japan

[73] Assignee: Mitsubishi Materials Corporation, Tokyo, Japan

[21] Appl. No.: 824,395

[22] Filed: Jan. 23, 1992

[30] Foreign Application Priority Data

Jan. 23, 1991 [JP] Japan .................. 3-6625

[51] Int. Cl.$^5$ .............................. B26D 1/12
[52] U.S. Cl. .................. 407/39; 407/41; 407/120
[58] Field of Search ............ 407/34, 36–39, 407/40, 41, 47–49, 51, 52, 55, 56, 120

[56] References Cited

U.S. PATENT DOCUMENTS

| | | | |
|---|---|---|---|
| 1,136,085 | 4/1915 | Backert | 407/56 X |
| 1,397,119 | 11/1921 | Wiard | 407/38 |
| 1,460,028 | 6/1923 | Mattson | 407/36 |
| 4,164,380 | 8/1979 | Peters | 407/36 |
| 4,808,044 | 2/1989 | Tsuvimura et al. | 407/41 X |
| 5,059,068 | 10/1991 | Scott | 407/33 X |

FOREIGN PATENT DOCUMENTS 55-112712  8/1980  Japan .
62-043762  11/1987  Japan .

Primary Examiner—Larry I. Schwartz
Assistant Examiner—J. R. Daulton
Attorney, Agent, or Firm—Cushman, Darby & Cushman

[57] ABSTRACT

An inserted tooth rotary cutter is disclosed which includes a tool body having an axis of rotation therethrough and a plurality of indexable cutting inserts. The tool body is defined by forward and rearward axial faces and a circumferential surface lying between the forward and rearward axial faces. The tool body has a plurality of insert receiving recesses formed in the circumferential surface in circumferentially spaced relation to one another and has a mounting bore formed coaxially therewith. Furthermore, the tool body has a plurality of through holes formed in circumferentially spaced relation to one another. Each through hole is disposed between two adjacent insert receiving recesses and opens to the circumferential surface and the forward axial face. Each insert is releasably secured to a respective insert receiving recess.

4 Claims, 4 Drawing Sheets

ROTARY CUTTER

BACKGROUND OF THE INVENTION

1. Field of the Invention

The present invention relates to a rotary cutter having a plurality of indexable cutter inserts releasably attached to the forward end of a tool body.

2. Prior Art

A rotary cutter, which comprises a plurality of indexable cutter inserts releasably attached to an outer periphery of a tool body, is extensively used as a face milling cutter, a side milling cutter and the like.

FIG. 5 depicts one conventional inserted tooth rotary cutter. In this cutter, a plurality of recesses are formed in a steel tool body 1 in circumferentially spaced relation to one another to provide chip pockets 2, and an insert-receiving recess 3 is formed in that face of each chip pocket 2 which faces in a direction of rotation of the tool body 1. An indexable cutter insert 4 is received in each of the insert-receiving recesses 3 and releasably secured thereto by means of a clamp wedge 5. A bore 6, for securing the tool body 1 to a suitable drive source, is formed through the axis of the tool body 1.

The conventional rotary cutter as described above; however, there are disadvantages in that since the tool body 1 is entirely formed of steel, it is heavy, so that its handling is difficult. In order to reduce the weight, the tool body 1 may be formed of aluminum. However, since aluminum is inferior in rigidity to steel, it has been impossible to form the tool body 1 entirely of aluminum, and the use of aluminum has been limited only to those portions which are not required to be strong. As a result, a substantial reduction in weight cannot be attained. In addition, inasmuch as steel and aluminum must be joined together, the manufacturing cost is inevitably increased, or, in some cases, the manufacture of the tool itself has been impossible.

Furthermore, in the illustrated conventional rotary cutter, the clamp wedge 5 is used when securing the insert 4 to the insert-receiving recess 3. Therefore, the portions adjacent to the insert-mounting recesses 3 are subjected to elastic deformation as indicated by the arrows A in FIG. 5, and hence the tool body 1 is subjected to such a distortion as to cause the diameter of the mounting bore 6 to shrink. As a result, it has become difficult to secure the tool body 1 to the drive source, and the cutting precision of the tool is lowered. The above problem regarding the distortion has conventionally been solved simply by enlarging the diameter of the mounting bore 6 by an amount of about 0.02 to 0.03 mm in advance, as illustrated in FIG. 7. However, this method is not completely satisfactory.

Moreover, when cutting a workpiece of steel or the like using the rotary cutter, cutting heat having a temperature of about 800° C. is generated at the tip end of the cutting edge and this heat is transferred to the workpiece, the cutting debris, and the tool body 1. The tool body 1 is heated by the cutting heat thus transferred, and is subjected to thermal expansion. As a result, the dimensions in various portions of the tool change, and difficulty arises in the maintenance of cutting precision. Furthermore, when the cutting operation is continuously carried out for a prolonged period of time, the temperature of the tool body 1 becomes extremely high. As a result, it may be impossible to handle the tool by hand, and it may also become difficult to detach the tool from the drive source.

SUMMARY OF THE INVENTION

It is therefore an object and feature of the present invention to provide a rotary cutter which is light in weight and is less susceptible to distortion, and in which the cutting heat generated can be efficiently dissipated.

According to the present invention, there is provided a rotary cutter comprising:

A tool body having an axis of rotation therethrough and defined by forward and rearward axial faces and a circumferential surface lying between the forward and rearward axial faces, the tool body having a plurality of insert receiving recesses formed in the circumferential surface in circumferentially spaced relation to one another and having a mounting bore formed coaxially therewith, the tool body having a plurality of through holes formed in circumferentially spaced relation to one another, each of the through holes being disposed between two adjacent insert receiving recesses and opening to the circumferential surface and the forward axial face; and A plurality of indexable cutting inserts each releasably attached to a respective one of the insert receiving recesses.

In the above rotary cutter, since a plurality of the through holes are formed in the tool body, the weight of the tool can be substantially reduced. In addition, the distortion, caused by the wedging force of the clamp wedge, can be eliminated by the through holes, so that the deformation of the mounting bore can be avoided. Furthermore, since the surface area of the tool body is increased due to the provision of the above through holes, an increase of the temperature of the tool body can also be prevented.

DESCRIPTION OF THE PREFERRED EMBODIMENTS OF THE INVENTION

Figure 1:
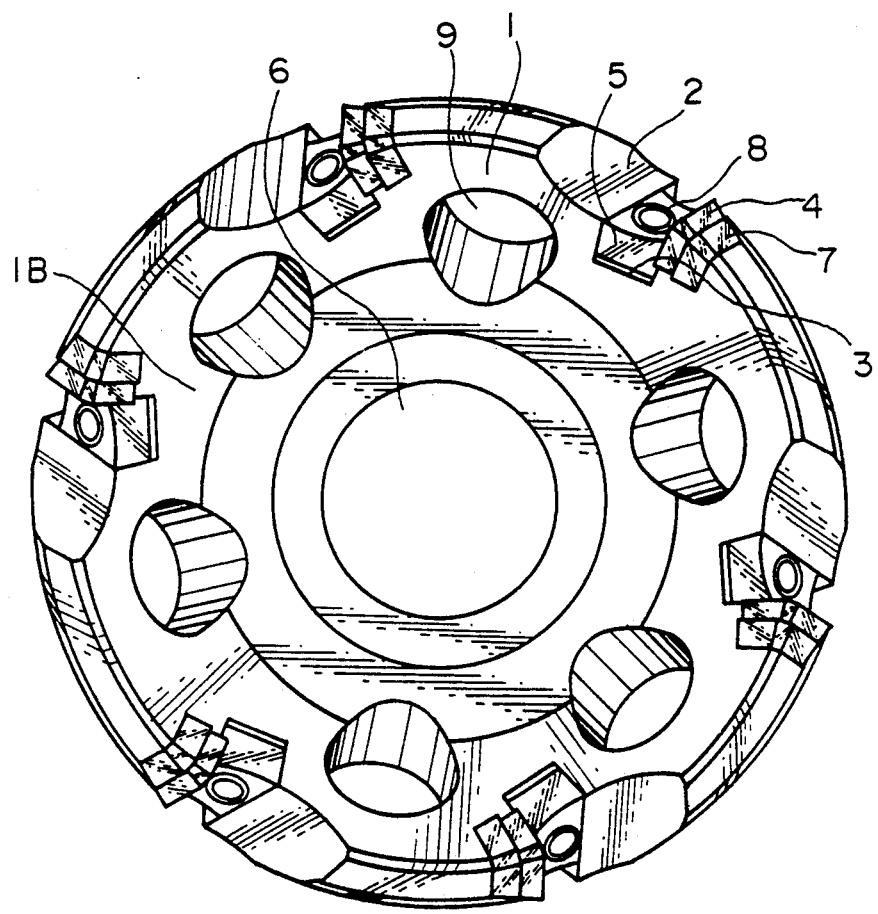
FIG. 1 is an end view of a rotary cutter in accordance with an embodiment of the present invention.
Figure 5:
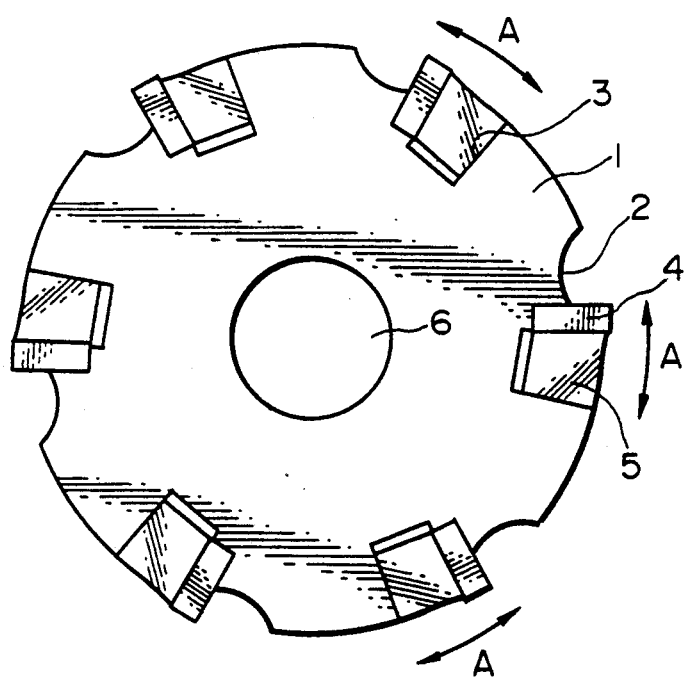
FIG. 5 is an end view of a conventional rotary cutter.

FIG. 1 depicts an inserted tooth rotary cutter in accordance with a preferred embodiment of the present invention, in which the same reference numerals are used to designate the same parts or members as in the conventional cutter shown in FIG. 5.

The rotary cutter includes a tool body 1 having an axis of rotation therethrough and defined by forward and rearward axial faces 1A and 1B and a circumferential surface 1C lying between the forward and rearward axial faces. A plurality of insertreceiving recesses 3 are formed in the circumferential surface 1C in circumferentially equally spaced relation to one another. An indexable cutter insert 4 is received in a respective insert receiving recess 3, and is releasably secured thereto by means of a clamp wedge 5, which is secured to the tool body 1 by means of a bolt 8. In addition, as shown in the drawings, the insert 4 is received on a support member 7.

Figure 2:
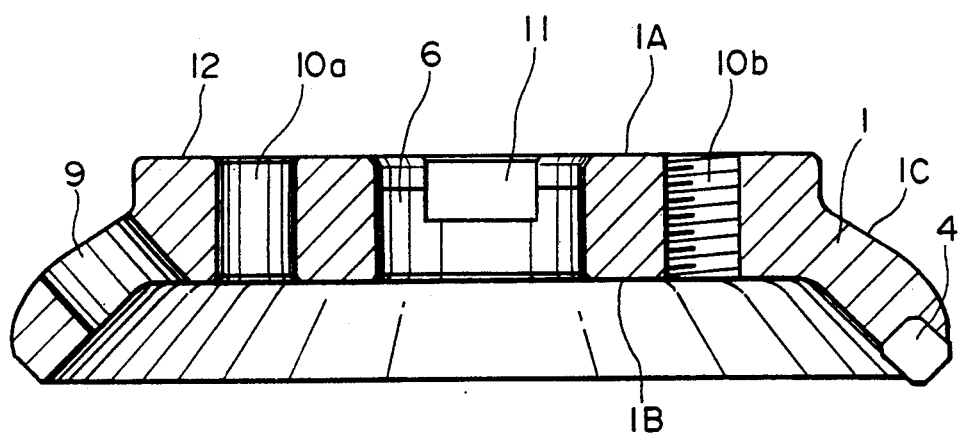
FIG. 2 is a cross-sectional view of the rotary cutter of FIG. 1.

Furthermore, in the present invention, a plurality of through holes 9 of a circular cross-section are formed in the tool body 1 in circumferentially equally spaced relation. Each of the through holes 9 extends straight and opens at its rearward end to the circumferential surface 1A and at its forward end to the forward axial face 1B. As best shown in FIG. 1, the through holes 9 are arranged such that they extend in a radial manner about the axis of rotation of the tool body 1, and that each through hole 9 is located between two adjacent insert-mounting recesses 3. In addition, as best shown in FIG. 2, apertures 10a and 10b, as well as a groove 11 for a drive key, are formed in the tool body 1 so as to open to the rearward axial face 1A. Therefore, the through holes 9 are formed in a radially outer position so that they do not interfere with the above apertures, groove or the like.

In the rotary cutter as described above, since a plurality of the through holes 9 are formed in the tool body 1, the weight of the tool can be reduced by an amount equal to the steel weight of those portions removed from the tool body. For this reason, the weight of the tool body can be further reduced compared with the case of the weight reduction using aluminum. Furthermore, since the operator can carry the tool by inserting his fingers into the through holes 9, the tool can be easily and safely handled even though the surface of the tool is greasy and slippery due to cutting oil adhering thereto. Moreover, since the through holes 9 are formed through the tool body 1 in a radial manner about the axis of rotation, the through holes can be made large in size without lowering the tool strength.

Figure 3:
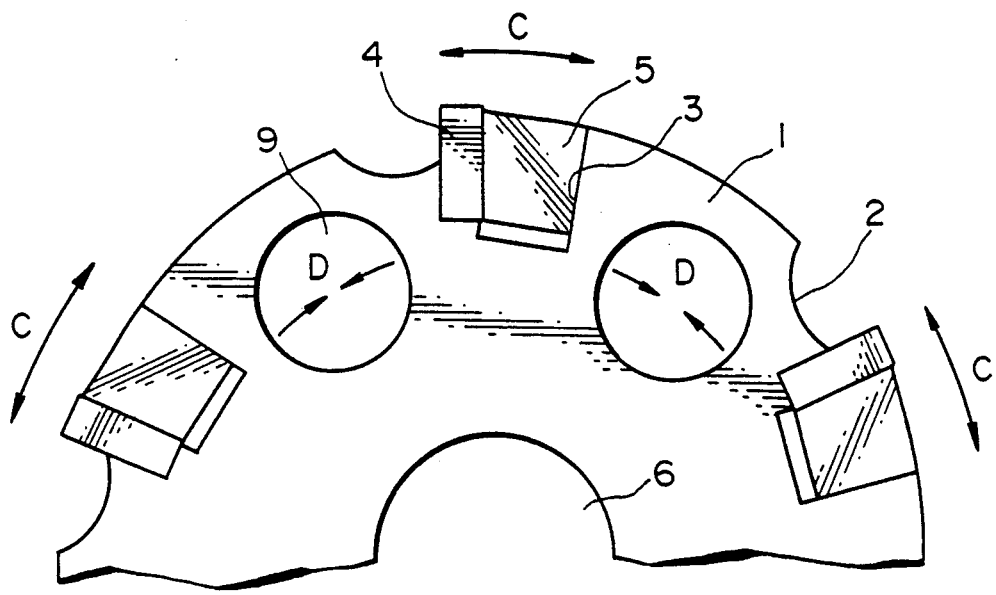
FIG. 3 is an end view of a part of the rotary cutter of FIG. 1, showing the function of the cutter.

In addition, as shown in FIG. 3, when the clamp wedges 5 are brought into pressing engagement with the inserts 4, the tool body 1 may be subjected to plastic deformation as indicated by the arrows C. However, such deformation can be eliminated since each through hole 9 is caused to deform in a direction indicated by the arrow D. Therefore, the deformation does not reach the mounting bore 6, and it is not necessary to enlarge the rear open end of the mounting bore 6 in advance. Accordingly, the securing and releasing operation can be carried out easily, and the cutting precision can be maintained at a satisfactory level.

Furthermore, since the surface area of the tool body 1 is increased due to the provision of the through holes 9, the cutting heat generated can be dissipated very efficiently. Therefore, the temperature increase of the tool can be prevented, and the deterioration of cutting precision due to the thermal expansion of the tool body can be avoided.

Figure 4:
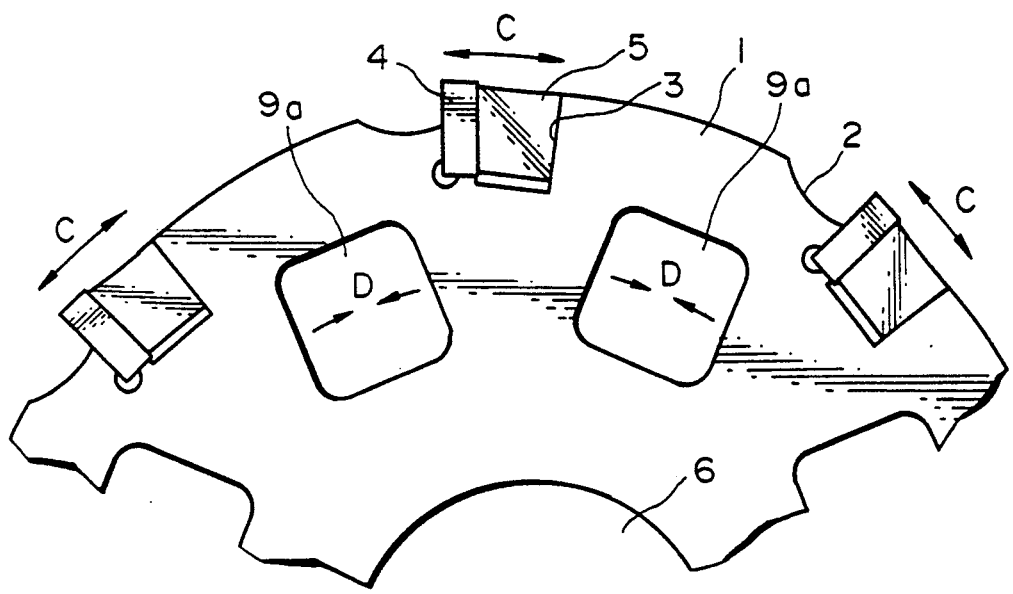
FIG. 4 is an end view of a rotary cutter in accordance with another embodiment of the present invention.
Figure 6:
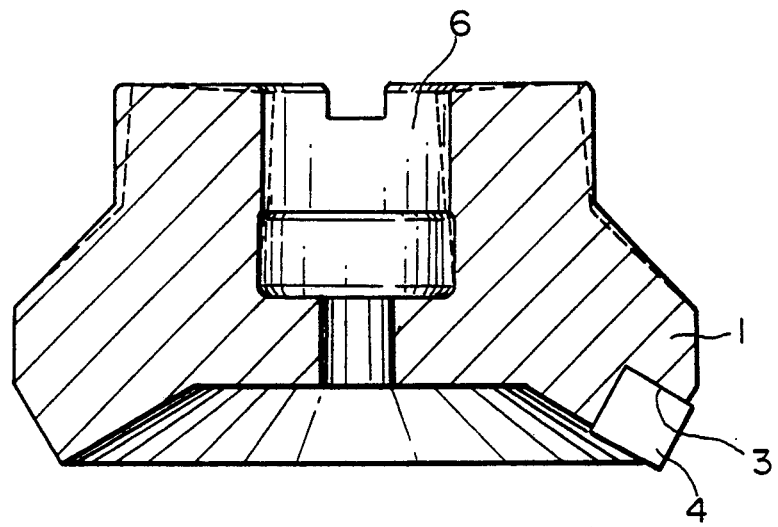
FIG. 6 is a cross-sectional view of the conventional rotary cutter, showing the distortion of the tool body.
Figure 7:
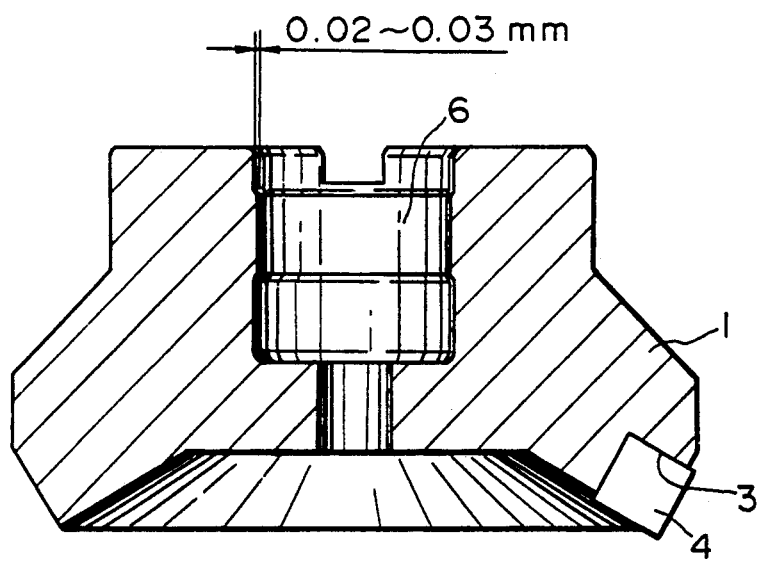
FIG. 7 is a view similar to FIG. 6, but showing an enlargement of the open end of the mounting bore.

Obviously, many modifications and variations of the present invention are possible in the light of the above. For example, the through holes 9 as well as the cutting inserts may be arranged in circumferentially unequally spaced relation to one another. Furthermore, the through holes 9 may be of different cross-sections. For example, as shown in FIG. 4, the through holes 9a may be of a square cross-section.

We claim:

1. A rotary cutter comprising:
   a tool body having an axis of rotation therethrough and defined by forward and rearward axial faces and a circumferential surface lying between said forward and rearward axial faces, said tool body having a plurality of insert receiving recesses formed in said circumferential surface in circumferentially spaced relation to one another and having a mounting bore formed coaxially therewith, said tool body having a plurality of vacant through holes formed in circumferentially spaced relation to one another, each of said through holes being disposed so as to extend in a radial manner about said axis of rotation of said tool body and opening to said circumferential surface and said forward axial face, each of said through holes being disposed between two adjacent insert receiving recesses whereby distortion of the tool body is prevented;
   a plurality of indexable cutting inserts each releasably attached to a respective one of said insert receiving recesses; and
   a plurality of clamp wedges each received in a respective one of said insert receiving recesses for securing a respective cutting insert.

2. A rotary cutter as recited in claim 1, wherein said through holes formed in said tool body are arranged in circumferentially equally spaced relation to one another.

3. A rotary cutter as recited in claim 1, wherein each of said through holes has a circular cross-section.

4. A rotary cutter as recited in claim 1, wherein each of said through holes has a square cross-section.

* * * * *